United States Patent
Child (10) Patent No.: US 12,236,780 B2
(45) Date of Patent: Feb. 25, 2025

(54) SYSTEMS AND METHODS FOR ELECTRONIC SIGNATURE TRACKING AND ANALYSIS

(71) Applicant: Selex ES Inc., Greensboro, NC (US)

(72) Inventor: Todd Child, Greensboro, NC (US)

(73) Assignee: Leonardo US Cyber and Security Solutions, LLC, Greensboro, NC (US)

( * ) Notice: Subject to any disclaimer, the term of this patent is extended or adjusted under 35 U.S.C. 154(b) by 253 days.

(21) Appl. No.: 17/940,368

(22) Filed: Sep. 8, 2022

(65) Prior Publication Data

US 2023/0070108 A1    Mar. 9, 2023

Related U.S. Application Data

(60) Provisional application No. 63/242,145, filed on Sep. 9, 2021.

(51) Int. Cl.
*G08G 1/017*    (2006.01)
*G06N 7/01*    (2023.01)
*G08G 1/04*    (2006.01)

(52) U.S. Cl.
CPC .............. *G08G 1/017* (2013.01); *G06N 7/01* (2023.01); *G08G 1/04* (2013.01)

(58) Field of Classification Search
CPC ............ G08G 1/017; G08G 1/04; G06N 7/01
See application file for complete search history.

(56) References Cited

U.S. PATENT DOCUMENTS

| | | | |
|---|---|---|---|
| 3,656,111 A | 4/1972 | Royster, Sr. | |
| 4,843,463 A | 6/1989 | Michetti | |
| 6,140,941 A | 10/2000 | Dwyer et al. | |
| 6,340,935 B1 | 1/2002 | Hall | |
| 6,538,580 B2 | 3/2003 | Bostrom | |
| 6,650,765 B1 | 11/2003 | Alves | |

(Continued)

FOREIGN PATENT DOCUMENTS

| | | |
|---|---|---|
| AU | 2013201309 B2 | 8/2014 |
| CA | 2620630 C | 9/2014 |

(Continued)

OTHER PUBLICATIONS

Howington, Larry C.; Automated License Plate Reading; Development and use of Perceptics multi-purpose License Plate Reader Technology; Sep. 1989.

(Continued)

*Primary Examiner* — Brian Wilson (74) *Attorney, Agent, or Firm* — Womble Bond Dickinson (US) LLP (57) ABSTRACT

Surveillance systems and methods for collecting electronic signatures and visual identifiers of targets to help create identifications or records of targets associated with one or more particular electronic signatures. The surveillance systems and methods can include an event analysis system and methodologies to facilitate classification and association of the collected visual identifiers of the targets with the collected electronic signatures of such targets, and can generate alarms or "hits" indicating presence of a known target across subsets of locations and times of occurrence of such hits or alarms for enhancing tracking and movement of targets throughout selected geographic areas or locations.

20 Claims, 5 Drawing Sheets

(56) References Cited

U.S. PATENT DOCUMENTS

| | | |
|---|---|---|
| 6,754,368 B1 | 6/2004 | Cohen |
| 6,844,841 B1 | 1/2005 | Masciulli |
| 6,922,138 B2 | 7/2005 | Melvin |
| 6,959,869 B2 | 11/2005 | Tsikos et al. |
| 6,982,654 B2 | 1/2006 | Rau et al. |
| 7,046,169 B2 | 5/2006 | Bucholz et al. |
| 7,173,526 B1 | 2/2007 | Monroe |
| 7,227,974 B2 | 6/2007 | Kamijo et al. |
| 7,342,511 B2 | 3/2008 | Schuette |
| 7,344,284 B2 | 3/2008 | Lynam et al. |
| 7,382,280 B2 | 6/2008 | Long |
| 7,460,028 B2 | 12/2008 | Garibotto et al. |
| 7,465,108 B2 | 12/2008 | Brown |
| 7,482,910 B2 | 1/2009 | Melvin |
| 7,504,965 B1 | 3/2009 | Windover et al. |
| 7,535,793 B2 | 5/2009 | Frantz |
| 7,825,829 B2 | 11/2010 | Madsen |
| 7,868,912 B2 | 1/2011 | Venetianer |
| 7,889,931 B2 | 2/2011 | Webb et al. |
| 7,920,626 B2 | 4/2011 | Fernandez |
| 8,068,154 B2 | 11/2011 | Jacob et al. |
| 8,117,090 B2 | 2/2012 | Romero |
| 8,243,140 B1 | 8/2012 | Howe |
| 8,408,772 B2 | 4/2013 | Li |
| 8,447,112 B2 | 5/2013 | Paul et al. |
| 8,666,801 B2 | 3/2014 | Cho |
| 8,693,733 B1 | 4/2014 | Harrison |
| 8,704,889 B2 | 4/2014 | Hofman |
| 8,774,465 B2 | 7/2014 | Christopulos et al. |
| 8,781,169 B2 | 7/2014 | Jackson et al. |
| 8,817,098 B2 | 8/2014 | Millar |
| 8,953,044 B2 | 2/2015 | Wu et al. |
| 8,983,137 B2 | 3/2015 | Hradetzky |
| 9,058,619 B2 | 6/2015 | Nandakumar et al. |
| 9,141,503 B1 | 9/2015 | Chen |
| 9,158,954 B2 | 10/2015 | Thuries et al. |
| 9,171,382 B2 | 10/2015 | Nerayoff et al. |
| 9,245,203 B2 | 1/2016 | Hofman et al. |
| 9,280,895 B2 | 3/2016 | Wang et al. |
| 9,327,685 B1 | 5/2016 | Wooten |
| 9,342,934 B2 | 5/2016 | Chen |
| 9,426,345 B1 | 8/2016 | Turner, Jr. et al. |
| 9,436,880 B2 | 9/2016 | Bos et al. |
| 9,471,838 B2 | 10/2016 | Miller et al. |
| 9,477,917 B1 | 10/2016 | Koch |
| 9,491,420 B2 | 11/2016 | Mimar |
| 9,495,869 B2 | 11/2016 | Bhogal et al. |
| 9,497,393 B2 | 11/2016 | Reed et al. |
| 9,538,060 B1 | 1/2017 | Cilia |
| 9,542,609 B2 | 1/2017 | Wu et al. |
| 9,594,158 B2 | 3/2017 | Abl |
| 9,607,510 B1 | 3/2017 | DeLorean |
| 9,652,666 B2 | 5/2017 | Nerayoff et al. |
| 9,685,084 B2 | 6/2017 | Scholl et al. |
| 9,715,703 B2 | 7/2017 | Robinson et al. |
| 9,779,309 B1 | 10/2017 | Fink et al. |
| 9,796,331 B2 | 10/2017 | Karner et al. |
| 9,818,157 B2 | 11/2017 | McCall et al. |
| 9,846,883 B2 | 12/2017 | Angell et al. |
| 9,858,493 B2 | 1/2018 | Tseng |
| 9,911,297 B2 | 3/2018 | Lundy |
| 9,972,230 B1 | 5/2018 | DeLorean |
| 9,990,376 B2 | 6/2018 | Voeller et al. |
| 9,996,861 B2 | 6/2018 | Ryan et al. |
| 10,027,361 B2 | 7/2018 | Griffin |
| 10,032,212 B2 | 7/2018 | Winkelman et al. |
| 10,055,906 B1 | 8/2018 | Fournier et al. |
| 10,057,713 B1 | 8/2018 | Rackley, III et al. |
| 10,089,869 B1 | 10/2018 | Makled et al. |
| 10,121,172 B2 | 11/2018 | Hudson |
| 10,127,437 B2 | 11/2018 | Bhanu et al. |
| 10,140,488 B1 | 11/2018 | Bondarenko et al. |
| 10,152,858 B2 | 12/2018 | Boykin |
| 10,164,974 B2 | 12/2018 | Spencer et al. |
| 10,198,954 B2 | 2/2019 | Holtzman et al. |
| 10,217,034 B2 | 2/2019 | Hoshino |
| 10,223,609 B2 | 3/2019 | Bhanu |
| 10,373,226 B1 | 8/2019 | Russell |
| 10,417,816 B2 | 9/2019 | Satzoda et al. |
| 10,559,200 B1 | 2/2020 | Langley et al. |
| 10,691,968 B2 | 6/2020 | Blais-Morin et al. |
| 10,872,524 B2 | 12/2020 | Kienitz et al. |
| 11,030,892 B1 | 6/2021 | Langley et al. |
| 11,080,533 B2 | 8/2021 | Camilus et al. |
| 11,243,959 B1 * | 2/2022 | Gilboa .................. G06F 16/285 |
| 11,941,716 B2 | 3/2024 | Child et al. |
| 2002/0089157 A1 | 7/2002 | Breed et al. |
| 2002/0186148 A1 | 12/2002 | Trajkovic et al. |
| 2003/0131011 A1 | 7/2003 | Haunschild et al. |
| 2004/0218052 A1 | 11/2004 | DiDomenico et al. |
| 2005/0012817 A1 | 1/2005 | Hampapur |
| 2005/0065711 A1 | 3/2005 | Dahlgren et al. |
| 2006/0007308 A1 | 1/2006 | Ide |
| 2006/0028556 A1 | 2/2006 | Bunn et al. |
| 2006/0030985 A1 | 2/2006 | Lawida et al. |
| 2006/0106659 A1 | 5/2006 | Santos et al. |
| 2006/0109083 A1 | 5/2006 | Rathus et al. |
| 2006/0180647 A1 | 8/2006 | Hansen |
| 2006/0269105 A1 | 11/2006 | Langlinais |
| 2006/0278705 A1 | 12/2006 | Hedley et al. |
| 2007/0008129 A1 | 1/2007 | Soliman |
| 2007/0009136 A1 | 1/2007 | Pawlenko |
| 2007/0069921 A1 | 3/2007 | Sefton |
| 2007/0112620 A1 | 5/2007 | Johnson |
| 2007/0229307 A1 | 10/2007 | Pawlenko et al. |
| 2007/0291118 A1 | 12/2007 | Shu et al. |
| 2008/0045245 A1 | 2/2008 | Billmaier et al. |
| 2008/0117296 A1 | 5/2008 | Egnal et al. |
| 2008/0285803 A1 | 11/2008 | Madsen |
| 2009/0088924 A1 | 4/2009 | Coffee et al. |
| 2009/0161913 A1 | 6/2009 | Son |
| 2010/0066537 A1 | 3/2010 | Weller et al. |
| 2010/0088123 A1 | 4/2010 | McCall et al. |
| 2010/0195871 A1 | 8/2010 | Simon |
| 2010/0245582 A1 | 9/2010 | Harel |
| 2011/0053559 A1 | 3/2011 | Klein |
| 2011/0134240 A1 | 6/2011 | Anderson et al. |
| 2011/0228085 A1 | 9/2011 | Hofman |
| 2011/0228253 A1 | 9/2011 | Batten et al. |
| 2011/0267222 A1 | 11/2011 | Craig |
| 2011/0313644 A1 | 12/2011 | Grassi |
| 2012/0106801 A1 | 5/2012 | Jackson |
| 2012/0140079 A1 | 6/2012 | Millar |
| 2012/0155712 A1 | 6/2012 | Paul et al. |
| 2013/0082828 A1 | 4/2013 | Furey et al. |
| 2013/0093886 A1 | 4/2013 | Rothschild |
| 2013/0129152 A1 | 5/2013 | Rodriguez Serrano et al. |
| 2013/0132166 A1 | 5/2013 | Wu et al. |
| 2013/0135468 A1 | 5/2013 | Kim |
| 2013/0282448 A1 | 10/2013 | Rydbeck et al. |
| 2013/0303189 A1 | 11/2013 | Bennett |
| 2013/0306728 A1 | 11/2013 | Thuries et al. |
| 2013/0308003 A1 | 11/2013 | Raghavan |
| 2013/0325629 A1 | 12/2013 | Harrison |
| 2014/0046800 A1 | 2/2014 | Chen |
| 2014/0066089 A1 * | 3/2014 | Monks .................. G01S 5/0295 |
| | | 455/456.1 |
| 2014/0093125 A1 | 4/2014 | Hradetzky |
| 2014/0126779 A1 | 5/2014 | Duda |
| 2014/0139660 A1 | 5/2014 | Zhu |
| 2014/0159925 A1 | 6/2014 | Mimeault et al. |
| 2014/0160283 A1 | 6/2014 | Hofman et al. |
| 2014/0225719 A1 | 8/2014 | Kesavan et al. |
| 2014/0241585 A1 | 8/2014 | Zafiroglu et al. |
| 2014/0254866 A1 | 9/2014 | Jankowski et al. |
| 2014/0254877 A1 | 9/2014 | Jankowski et al. |
| 2014/0254878 A1 | 9/2014 | Jankowski et al. |
| 2014/0334684 A1 | 11/2014 | Strimling |
| 2015/0049914 A1 | 2/2015 | Alves |
| 2015/0054676 A1 | 2/2015 | Vinski et al. |
| 2015/0113012 A1 | 4/2015 | Silver |
| 2015/0119069 A1 | 4/2015 | Harris et al. |
| 2015/0123794 A1 | 5/2015 | Hamalainen et al. |
| 2015/0138001 A1 | 5/2015 | Davies |

(56) References Cited

U.S. PATENT DOCUMENTS

| | | |
|---|---|---|
| 2015/0149465 A1 | 5/2015 | Unser et al. |
| 2015/0154669 A1 | 6/2015 | Wu et al. |
| 2015/0205868 A1 | 7/2015 | Boncyk et al. |
| 2015/0294373 A1 | 10/2015 | Schuh |
| 2015/0310293 A1 | 10/2015 | Dehart |
| 2015/0317687 A1 | 11/2015 | Ramesh et al. |
| 2015/0348342 A1 | 12/2015 | Baxley et al. |
| 2015/0356498 A1 | 12/2015 | Casanova |
| 2015/0381948 A1 | 12/2015 | Renkis |
| 2016/0021344 A1 | 1/2016 | Renkis |
| 2016/0098864 A1 | 4/2016 | Nawrocki |
| 2016/0110759 A1 | 4/2016 | Polehn et al. |
| 2016/0112461 A1 | 4/2016 | Othmer |
| 2016/0124071 A1 | 5/2016 | Baxley et al. |
| 2016/0266579 A1 | 9/2016 | Chen |
| 2016/0343252 A1 | 11/2016 | Davies et al. |
| 2016/0344979 A1 | 11/2016 | Renkis |
| 2017/0018170 A1 | 1/2017 | Sayavong et al. |
| 2017/0032666 A1 | 2/2017 | Pretorius et al. |
| 2017/0048376 A1 | 2/2017 | Logan |
| 2017/0061506 A1 | 3/2017 | Dow et al. |
| 2017/0124395 A1 | 5/2017 | Cohen et al. |
| 2017/0126648 A1 | 5/2017 | Bond et al. |
| 2017/0131202 A1 | 5/2017 | McClintock et al. |
| 2017/0140237 A1 | 5/2017 | Voeller et al. |
| 2017/0186317 A1 | 6/2017 | Franklin et al. |
| 2017/0193810 A1 | 7/2017 | Cao et al. |
| 2017/0206559 A1 | 7/2017 | Bakshi et al. |
| 2017/0308964 A1 | 10/2017 | Morris et al. |
| 2017/0330455 A1 | 11/2017 | Kikuchi et al. |
| 2017/0339529 A1 | 11/2017 | Buttolo et al. |
| 2017/0357662 A1 | 12/2017 | Knany et al. |
| 2017/0357881 A1 | 12/2017 | Hoshino |
| 2017/0365105 A1 | 12/2017 | Rao et al. |
| 2017/0372143 A1 | 12/2017 | Barcus et al. |
| 2017/0374324 A1 | 12/2017 | Loftus |
| 2018/0032590 A1* | 2/2018 | Recavarren ........... G06F 16/248 |
| 2018/0072177 A1 | 3/2018 | Tremblay |
| 2018/0096595 A1 | 4/2018 | Janzen et al. |
| 2018/0107528 A1 | 4/2018 | Vizer et al. |
| 2018/0107892 A1 | 4/2018 | Istenes |
| 2018/0137356 A1 | 5/2018 | Nerayoff et al. |
| 2018/0144382 A1 | 5/2018 | Makke et al. |
| 2018/0165935 A1 | 6/2018 | VanBlon et al. |
| 2018/0174457 A1 | 6/2018 | Taylor |
| 2018/0197416 A1 | 7/2018 | Hyde et al. |
| 2018/0211115 A1 | 7/2018 | Klein |
| 2018/0211116 A1 | 7/2018 | Modi et al. |
| 2018/0211117 A1 | 7/2018 | Ratti |
| 2018/0247519 A1 | 8/2018 | Bekanich |
| 2018/0253805 A1 | 9/2018 | Kelly et al. |
| 2018/0300578 A1 | 10/2018 | Wilbert et al. |
| 2018/0328757 A1 | 11/2018 | Chan et al. |
| 2018/0349699 A1 | 12/2018 | O'Connell et al. |
| 2018/0350230 A1 | 12/2018 | Kienitz et al. |
| 2018/0357247 A1 | 12/2018 | Siminoff et al. |
| 2019/0031146 A1 | 1/2019 | Etonye |
| 2019/0039463 A1 | 2/2019 | Moghe et al. |
| 2019/0043355 A1 | 2/2019 | Ferguson et al. |
| 2019/0050634 A1 | 2/2019 | Nerayoff et al. |
| 2019/0050652 A1 | 2/2019 | Baker et al. |
| 2019/0051142 A1 | 2/2019 | Wiles |
| 2019/0057601 A1 | 2/2019 | Watanabe et al. |
| 2019/0087864 A1 | 3/2019 | Hacker |
| 2019/0147260 A1 | 5/2019 | May |
| 2019/0147306 A1 | 5/2019 | Hoshino |
| 2019/0163982 A1 | 5/2019 | Block |
| 2019/0244498 A1 | 8/2019 | Dumas |
| 2019/0294890 A1 | 9/2019 | Kanga |
| 2019/0311327 A1 | 10/2019 | Habbaba et al. |
| 2019/0329421 A1 | 10/2019 | Deyle et al. |
| 2020/0097735 A1 | 3/2020 | Altuev |
| 2020/0104566 A1 | 4/2020 | Yamada et al. |
| 2020/0111350 A1 | 4/2020 | Julian et al. |
| 2020/0162701 A1 | 5/2020 | Nixon et al. |
| 2020/0211345 A1 | 7/2020 | Gordon-Carroll et al. |
| 2020/0265258 A1 | 8/2020 | Blais-Morin et al. |
| 2021/0026019 A1 | 1/2021 | Gahagan et al. |
| 2021/0044959 A1 | 2/2021 | Beaurepaire |
| 2021/0225161 A1 | 7/2021 | Horn |
| 2021/0326563 A1 | 10/2021 | Kossor |
| 2021/0398298 A1 | 12/2021 | Kisara |
| 2022/0141426 A1 | 5/2022 | Kim et al. |
| 2022/0148320 A1 | 5/2022 | Alakarhu |
| 2022/0188953 A1 | 6/2022 | Child et al. |
| 2022/0294946 A1 | 9/2022 | D'Annunzio |
| 2023/0010292 A1 | 1/2023 | Simon |
| 2023/0046309 A1 | 2/2023 | May |
| 2023/0073717 A1 | 3/2023 | Child |
| 2023/0073876 A1 | 3/2023 | Child |
| 2023/0162310 A1 | 5/2023 | Child et al. |
| 2023/0177954 A1 | 6/2023 | Neff et al. |
| 2023/0196780 A1 | 6/2023 | Nieuwkerk et al. |
| 2023/0237907 A1 | 7/2023 | Valcarcel et al. |
| 2023/0274647 A1 | 8/2023 | Nieuwkerk et al. |
| 2024/0021092 A1 | 1/2024 | Child |
| 2024/0185371 A1 | 6/2024 | Child et al. |

FOREIGN PATENT DOCUMENTS

| | | |
|---|---|---|
| CA | 2916418 A1 | 6/2017 |
| CA | 3000127 A1 | 6/2018 |
| CA | 2924997 C | 6/2021 |
| CA | 2979406 C | 2/2024 |
| CN | 102708693 A | 10/2012 |
| CN | 203050715 U | 7/2013 |
| DE | 102005035242 A1 | 2/2007 |
| EP | 0784838 B1 | 6/2000 |
| EP | 1993279 A2 | 11/2008 |
| EP | 3726253 A1 | 10/2020 |
| EP | 3989194 A1 | 4/2022 |
| FR | 2975210 A3 | 11/2012 |
| GB | 2328731 A | 3/1999 |
| IN | 282920 B | 5/2017 |
| SG | 140858 A1 | 4/2008 |
| TW | 201935419 A | 9/2019 |
| WO | WO2004/027730 A1 | 4/2004 |
| WO | WO2007/032025 A2 | 3/2007 |
| WO | WO2008/088880 A1 | 7/2008 |
| WO | WO2011/023024 A1 | 3/2011 |
| WO | WO2012/038964 A2 | 3/2012 |
| WO | WO2014/152923 A1 | 9/2014 |
| WO | WO2015/193903 A2 | 12/2015 |
| WO | WO2017/180900 A1 | 10/2017 |
| WO | WO2018/009567 A1 | 1/2018 |
| WO | WO2019/043444 A1 | 3/2019 |
| WO | WO2019/043446 A1 | 3/2019 |
| WO | WO2019/162970 A1 | 8/2019 |
| WO | WO2020/145882 A1 | 7/2020 |

OTHER PUBLICATIONS

Waters, Rebecca; Automated License Plate Recognition: An Insider's Look; P&SN Police and Security News 2022; Posted by Publisher—Sep. 15, 2017.

Ceng, M. Smalley et al.; Videqual—A tool for quantitive meansurement of fixed CCTV Surveillance Systems; Presented and Published at the International Carnahan Conference on Security Technology 1996; 0-7803-3537-6-9/06; 1996 IEEE.

Kanayama, Kenji et al.; Development of Vehicle-License Number Recognition System Using Real-Time Image Processing and Its Application to Travel-Time Measurement; CH2944-7/91/0000/0798; 1991 IEEE.

Kwasnicka, Halina and Wawrzyniak, Bartosz; License Plate Localization and Recognition in Camera Pictures; AI-METH 2002—Artificial Intelligence Methods; Gliwice, Poland, Nov. 13-15, 2002.

Appian Technology PLC; Talon—Description and Technical Specification—Automatic Number Plate Recognition System; Copyright 2003.

Hoffman, Alwyn Jakobus and Albertus J. Pretorius: "SmartRoad; A new approach to law enforcement in dense traffic environments";

(56) References Cited

OTHER PUBLICATIONS

2015 IEEE 18th International Conference on Intelligent Transportation Systems. IEEE, 2015; Year 2015.

Yaacoub, et al.; Security analysis of drones systems: Attacks, limitations, and recommendations; Internet of Things 11 (2020) 100218; Elsevier; www.elsevier.com/locate/iot; Retrieved on Apr. 17, 2023 (Apr. 17, 2023) from https://www.ncbi.nlm.nih.gov/pmc/articles/PMC7206421/.

Makarov, A., et al.; Authenticating Vehicles and Drivers in Motion Based on Computer Vision and RFID Tags; 2012 IEEE 10th Jubilee International Symposium on Intelligent Systems and Informatics; IEEE 2012; Year 2012.

Notification of Transmittal and the International search Report and the Written Opinion of the International Searching Authority for PCT/US22/42916 dated Feb. 9, 2023.

Valera, M. and Velastin, S.A., "Intelligent distributed surveillance systems: a review", Source: vol. 152, Issue 2, Apr. 2005, p. 192-204, DOI: 10. 1049/ip-vis:20041147, Print ISSN 1350-245X, Online ISSN 1359-7108; 13 pages; 2005.

Hampapur, A.; "smart video surveillance: exploring the concept of multiscale spatiotemporal tracking", Published in: IEEE Signal Processing Magazine (vol. 22, Issue: 2, Mar. 2005), pp. 38-51; 2005.

Girgensohn, Andreas, "DOTS: Support for Effective Video Surveillance", MM '07: Proceedings of the 15th ACM International conference on Multimedia Sep. 2007; pp. 423-432; 2007.

Hu, Weiming, et al.; "A Survey on Visual Surveillance of Object Motion and Behaviors"; IEEE Transactions on Systems, Man, and Cybernetics, Part C: Applications and Reviews, vol. 34, No. 3, Aug. 2004; pp. 334-352; Year 2004.

Panganiban, Edward B. et al.; "RFID-Based Vehicle Monitoring System"; 2017 IEEE 9th International Conference on Humanoid, Nanotechnology, Information Technology, Communication and Control, Environmental Management (HNICEM); IEEE, Dec. 1-3, 2017; pp. 1-6; Year 2017.

\* cited by examiner

SYSTEMS AND METHODS FOR ELECTRONIC SIGNATURE TRACKING AND ANALYSIS

CROSS REFERENCE

The present Patent Application claims the benefit of United States Provisional Application No. 63/242,145, filed Sep. 9, 2021.

INCORPORATION BY REFERENCE

The disclosures made in U.S. Provisional Application No. 63/242,145, filed Sep. 9, 2021, are specifically incorporated by reference herein as if set forth in their entirety.

TECHNICAL FIELD

In one aspect, the present disclosure is directed to surveillance systems and methods, and more specifically, to surveillance systems and methods that facilitate collection and analysis, in relation to various factors, electronic signatures and/or visual identifiers. Other aspects also are described.

BACKGROUND

Automated License Plate Readers ("ALPR") typically are used for identifying vehicles in selected locations, e.g., for detecting traffic violations, collecting tolls, etc., However, existing ALPR systems are quite expensive and generally are used for identification of vehicles on roads, in parking lots, other vehicle throughways, etc . . . .

It can be seen that a need exists for surveillance systems and methods that can be used in conjunction with or in place of existing ALPR systems to provide for more precise, reliable, and/or consistent identification, tracking, and/or analysis of vehicles and/or persons.

The present disclosure is directed to the foregoing and other related, and unrelated, problems in the relevant art.

SUMMARY

Briefly described, the present disclosure includes surveillance systems and methods for collecting electronic signatures and/or visual identifiers of targets to facilitate association of such target identifiers with collected electronic signature information to help create identification records for known or identified targets, e.g. targets that can be visually identifiable (such as by a license plate read, car make and model, or other visual identifier) can be linked to or otherwise associated with one or more particular electronic signatures. In embodiments, the surveillance systems and methods can utilize an event analysis system or engine and methodologies to classify reads of target identifiers and alarms or "hits" indicating presence of a known target (e.g., a stolen or suspect vehicle, etc . . . ) across subsets of locations and times of occurrence of such hits or alarms for enhancing tracking and movement of targets throughout selected geographic areas or locations. Targets generally refer to persons, vehicles, e.g., an automobile, or both, such a one or more persons within a vehicle. However, targets can include other objects, such as one or more electronic devices, e.g., cell phones or other communication devices, RFID and other sensors or transmitting devices internal to vehicles or as after-market additions, and/or various other, similar devices, without departing from the scope of the present disclosure.

According to aspects of the present disclosure, the surveillance system can include a plurality of collection systems or assemblies each located at selected geographic areas or locations. The collection systems generally are configured to capture or facilitate collection of information related to visual identifiers or electronic signatures associated with targets in or moving about the selected areas/locations. Each capture or collection may be associated with and/or stored with a particular time, date, and location data.

In some embodiments, the collection systems can include at least one sensor configured to collect or otherwise capture information related to visual identifiers and/or electronic signatures of targets. The visual identifiers can include visual vehicle identifiers, such as license plate information or other visual or imaged information associated with vehicles (e.g., stickers, patterns, position(s) of component parts, after-market added parts, damage, and/or various other markings, etc . . . ) that can be used to distinguish or otherwise identify, detect or discern a target vehicle, etc . . . . The electronic signatures can include an electronic signal or combination(s) of electronic signals emanating from transmitting electronic devices and which are associated with and/or can uniquely identify the targets in or moving about the selected areas/locations.

In addition, in some aspects, the surveillance system can include an intelligence system that is in communication with the plurality of collection systems. The intelligence system is configured to receive the information collected or captured by the collection systems, such as license plate reads such as images, video or other captured information from ALPR's that generate hits or alarms; which generally will be time and date stamped information in real time when targets get within proximity of the collection point systems (e.g., ALPR's), and to identify and/or track the targets based on this received information. In addition, in embodiments, the one or more classification and search engines can infer relationships between electronic devices and targets based on consistency of correlation to identify/extract electronic signatures associated with identified targets (based on known identifiers such as vehicle plate, make & model, and other associated information based on historical correlations with a particular target.

In embodiments, the intelligence system can include one or more classification and search engines and an intelligence database in communication therewith. The one or more classification and search engines are configured to identify or extract the electronic signatures associated with the targets using the summary tables/collections of information from the collection systems and applying statistical analysis to break down classes of the collected data in a manner that allows cataloging and visual navigation of statistically significant variations in the date, day-of-week, time, location, violation class, investigative case and/or specific vehicle license plate or plates. This allows an investigator to forecast the presence of a violation type, vehicle, or group of vehicles across time and location through a simple graphic charting interface.

In an embodiment, a method of operation of the surveillance system, includes a three-factor variable set structure for initially fixing day-of-week; time-of-day and source or classification-of-source. The method then allows the user to select 0, 1 or 2 factors and view the variation in the data by the non-selected factor. For example, the user can analyze crime data in data history by day, time and crime-type and then can select a specific day and type and thus be shown the distribution of incidents in history by time across the selected day and type thereby isolating a maximum frequency of incident across the selected variables.

The user can use a frequency and consistency of such crime data electronic signals to deploy investigative or enforcement resources based on the statistical distribution of alarms of the type that is of interest. Thus, a manager who wants to arrest drug suspects, can apply the disclosed statistical analysis to look at when and where drug alarms have occurred in the past, and thereafter can deploy his resources to the locations most likely to generate new alarms. The manager further can use such data to select alarm classes/crime activity based on selected variables such as days of the week, times, etc., in addition to types of crimes, and can determine a relative certainty of association of the selected targets to develop possible predictive patterns. Further, such relationships and/or associations can be visualized in the graphical or web-based user interfaces.

The one or more classification and search engines can be configured to filter or otherwise alter to the received electronic signatures, e.g., to reduce signal noise and facilitate identification or extraction of unique, identifying electronic signatures. In embodiments, the one or more classification and search engines can be configured to locate receipt of a visual identifier and correlated electronic signature to track the target, such as based on a visual vehicle identifier and correlated signatures, to allow independent tracking and location identification of targets based on the associated identifying electronic signatures. That is, once the system has records correlating electronic signatures associated with a specific visual vehicle identifier, e.g., a specific license plate number, the intelligence system will be able to detect the likely presence of a vehicle and its associated license plate without visual information, e.g., without the use of a camera.

The surveillance system thus is configurable to track, map, catalogue, etc., movements of the targets in real time as electronic signals emanating therefrom occur in proximity to the collection systems. The tracking information generated can be used to help confirm and/or authenticate a potential target identification, and further can be configured to generate alerts or notifications when certain targets are in proximity to the collection systems and can be used, as noted, in a number of user selectable visualizations.

In embodiments, the collection systems can be placed in locations or areas not associated with vehicular traffic, such that the intelligence system will be able to identify, and catalogue known electronic signatures away from the vehicles they have typically been associated with, e.g., for tracking, mapping, etc. of persons or electronic devices apart from vehicles. Each collection system can include a plurality of sensor assemblies, such as one or more cameras or camera systems configured to capture or facilitate collection of information related to vehicle identifiers, such as visual information related to a license plate of a vehicle or other visual vehicle identifiers. In addition, the sensor assemblies can include one or more antennas or other signal receivers configured to capture information related to the electronic signatures. The one or more antennas can include a plurality of antennas, such as a Bluetooth® antenna, a WiFi antenna, a RFID antenna, or other RF antennas or combinations thereof, configured to capture information related to electronic signals associated with the targets.

In some embodiments, the collection systems can be used in conjunction with Automated License Plate Readers ("ALPR") in certain areas, allowing the intelligence system to develop a subset of electronic signals, i.e., an electronic signature, associated with a license plate read at a moment in time and location. Electronic data points from less expensive collectors can then be used to provide more precise tracking than ALPR alone.

In some embodiments, the surveillance system can be configured to capture sample electronic signature information from a target, associate that information with the target's identification, and then search for or alert on receipts of similar electronic signature information at one of the collection point systems.

In additional embodiments, the surveillance system can be configured to allow for search inquiries or scans of suspect's electronic signatures to search known location data points in the database history, placing the suspect at those locations and times.

In still other embodiments, the surveillance system can be configured to allow for labeling of specific electronic signatures with a target and then alert or search for history of those specific electronic signatures in the database, placing the target at various locations.

In further embodiments, the surveillance system further can indicate or determine changes in association or travel of suspects or other individuals of interest based on variations in electronic signatures associated with a target or targets.

Various objects, features, and advantages of the present disclosure will become apparent to those skilled in the art upon a review of the following detail description, when taken in conjunction with the accompanying drawings.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

In embodiments, the present disclosure is directed to surveillance systems and methods for event analysis of collected event data, such as alarms or hits indicative of illegal activities (e.g., detection of stolen vehicles or vehicles identified with a criminal activity by ALPR systems) or a known target (e.g., a known criminal or wanted suspect/fugitive). The surveillance system and methods will employ a statistical analysis and projection of classifications for read (e.g., license plate reads, and other recognition data) and alarm data (e.g. flagged hits or alarms generated by such reads) across subsets of time and location of the collection of such read and alarms data. From a business/investigative perspective the system and methods are directed to enabling a manager or operator to deploy investigative or enforcement resources based on the statistical distribution of alarms of the type that is of interest. That is, if a manager wants to arrest drug suspects, he might want to look at when and where drug alarms have occurred in the past, and deploy his resources to the locations most likely to generate new alarms.

In embodiments, summary tables and statistical analysis are used to break down classes of data in a manner that allows visual navigation of statistically significant variations in the date, day-of-week, time, location, violation class, investigative case and/or specific vehicle license plate or plates. This allows an investigator to forecast the presence of a violation type, vehicle, or group of vehicles across time and location through a simple graphic charting interface. In addition, a three-factor variable set structure can be used for initially fixing day-of-week; time-of-day and source or classification-of-source. The method then allows the user to select 0, 1, or 2 factors and view the variation in the data by the non-selected factor. For example, the user can analyze crime data in data history by day, time, and crime-type and then can select a specific day and type and thus be shown the distribution of incidents in history by time across the selected day and type thereby isolating a maximum frequency of incident across the selected variables.

Figure 1:
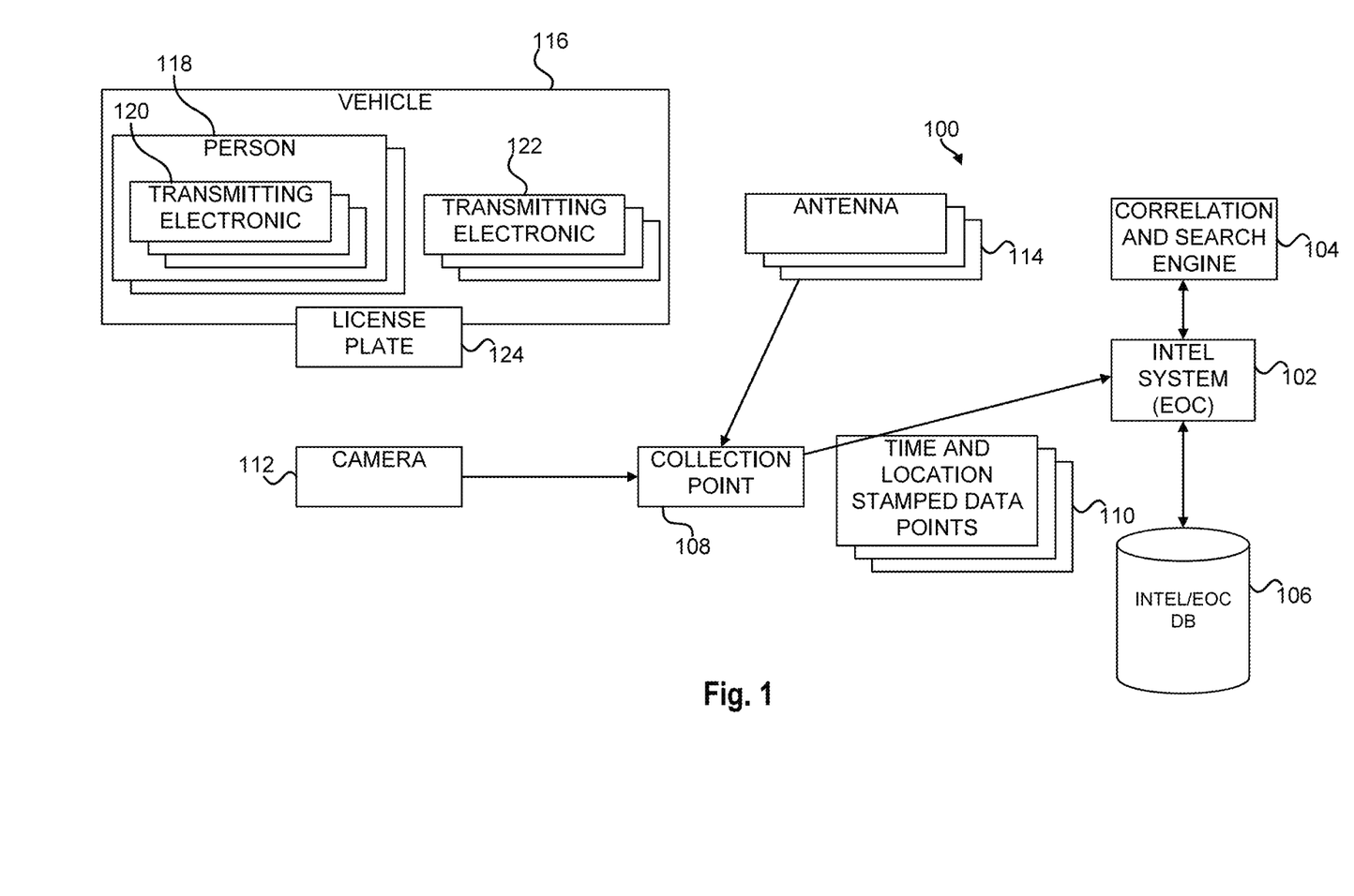
FIG. 1 is a schematic diagram of a surveillance system according to embodiments of the present disclosure.

FIG. 1 provides a schematic diagram of an example embodiment of a surveillance system for collecting and correlating electronic signatures and visual identifier information to build intelligence databases that facilitate tracking and associating indications of common location and movement of targets throughout selected geographic areas or locations at specified times.

As indicated in FIG. 1, the surveillance system includes a plurality of collection systems or assemblies that are located at selected geographic areas or locations. The collection systems generally will be configured to capture or facilitate collection of information related to visual identifiers and/or electronic signatures associated with targets. The targets generally will include persons 118, vehicles 116, or a combination of both in and/or moving about the selected areas or locations. Targets also can include transmitted electronic devices 120, 122 or other objections, without departing from the scope of the present disclosure. The collection systems can be positioned at various locations or collection points 108 about a specific geographic area, e.g., a municipality, county, other public or private areas, or combinations thereof.

FIG. 1 further shows an embodiment wherein each collection system includes a sensor or sensor assembly configured to collect or otherwise capture the information related to visual identifiers and/or electronic signatures of targets. The sensor or sensor assembly accordingly can include one or more cameras 112 or camera systems configured to capture or facilitate collection of information related to vehicle identifiers, such as visual or imaged information related to a license plate 124 of a vehicle 116 and/or other visual vehicle identifiers that can be used to discern, detect and/or otherwise identify or confirm the identity of a target vehicle 116. For example, in some aspects, such vehicle markings can include, but are not limited to, signage, stickers, bumper stickers, non-license plate tags, patterns, position or configuration of component parts, damage to the vehicle, such as scratches, dents, repair marks, etc. and the location thereof on the vehicle, small markings or symbols or other indicia on vehicle components, as well as various other identifiable visual markings, or combinations thereof. In some embodiments, the camera system also can include an Automated License Plate Reader ("ALPR") integrated or otherwise associated with a collection system, or the surveillance system can include ALRPs in addition to, or in place of, one or more collection systems.

In addition, or in the alternative, the at least one sensor or sensor assembly also can include an antenna 114, antenna array, or plurality of antennas configured to capture or otherwise receive electronic signals from transmitting electronic devices 120, 122 associated with the targets for identification/extraction of electronic signatures. The at least one sensor or sensor assembly can include additional sensors, such as IR sensors or other light sensors, without departing from the present disclosure.

Figure 2:
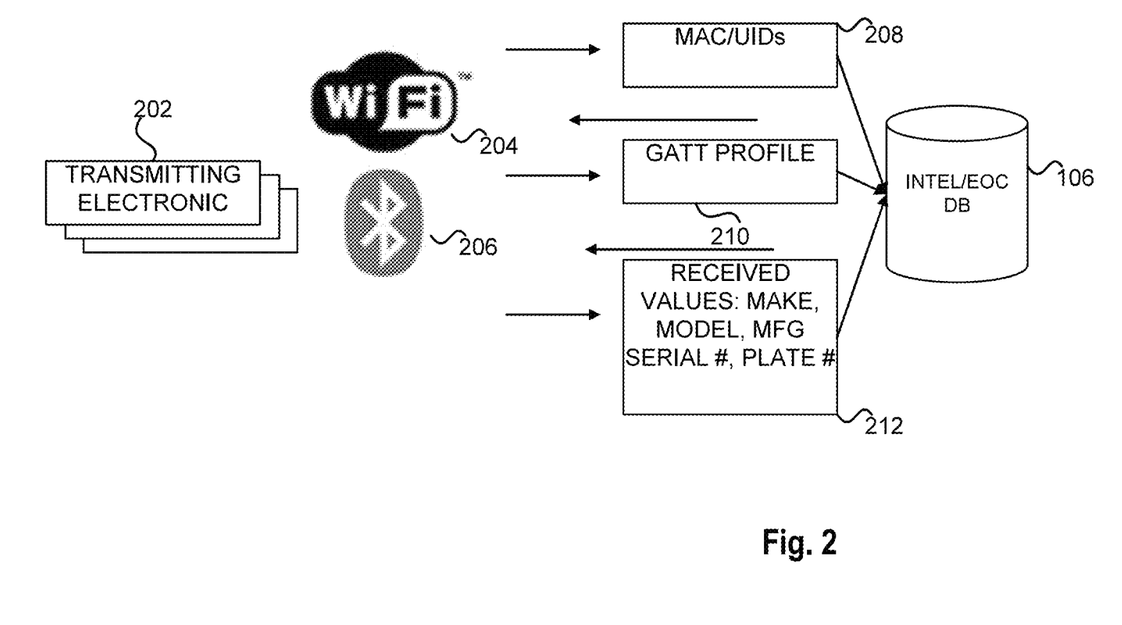
FIG. 2 illustrates an example of identifying information that can be captured and used for the event analysis according to embodiments of the present disclosure.

The transmitting electronic devices, as shown in FIG. 2, include, but are not limited to, transmitting electronic devices 202 associated with a vehicle, such as vehicle components including, but not limited to, tire pressure sensors or other manufacturer installed or after-market vehicle sensors, vehicle stereo or entertainments systems, vehicle navigation systems, vehicle infotainment systems, self-driving or driver assist vehicle guidance systems, vehicle WiFi hotspots, other components of internal or external vehicle systems, etc . . . ; and additionally can include transmitting electronic devices 202 associated with persons or other types of targets, including, but not limited to, cellular phones and/or other communication devices, tablets, laptops, smart watches, fitness trackers, wireless headphones, RFID tags (e.g., key cards, library books, assets tags, pallet transmitters, pet collars), WiFi hot spots, and other personal electronic devices.

Each sensor or sensor assembly providing collection and input of event data, e.g. hits/alarms from ALPR reads, electronic signature records, etc. will be configured to capture or collect signals transmitted by or otherwise emanating from the transmitting electronic devices 202 when the targets get within proximity of the collection systems. The collection systems can be configured to receive signals at a prescribed or selected proximity in relation thereto. For example, in some embodiments, the collection systems could be configured to look for and receive signals (e.g., for example, via Wifi 204, Bluetooth 206, RFID detection, or via another method of detecting and receiving electronic signals) transmitted within about 200 feet of the collection systems; while in other embodiments, such as to reduce or limit extraneous noise or to help filter such noise, shorter ranges of signals also can be used, i.e. in some locations, the collections systems can be configured to receive signals transmitted within about 100 feet of the collection systems, and in still other embodiments or locations, signals transmitted within about 50 feet of the collection systems. Other, varying ranges also can be used.

In embodiments, the electronic signatures can include information related to the collected electronic signals of the transmitting electronic devices 202 or combinations of collected electronic signals of the transmitting electronic devices 202 that uniquely identify the targets. For example, and without limitation, a combination of one or more signals from a plurality of transmitting electronic devices 202 (e.g., a watch, cell phone/communication device, headphones, etc.) can include an electronic signature that uniquely identifies a person (e.g. the electronic signature may be received as or may include a MAC user ID 208 and/or a GATT profile 210); a combination of one or more signals from a plurality of transmitting vehicle components (e.g., a vehicle sensor, infotainment system, etc.) can include an electronic signature that uniquely identifies a vehicle 116 (e.g., including, for example, received values such as make, model, manufacturing serial number, and/or license plate number as shown at 212), or one or more signals from a transmitting electronic device 120, 122 can include an electronic signature that uniquely identifies that electronic device In addition, the surveillance system 100 includes an intelligence system 102 that is in communication with the plurality of collection systems. The intelligence system 102 is configured to receive information (e.g., in one embodiment, time and location stamped data points 110) collected or captured by the collection systems and to identify and/or track targets or correlate a target with other targets or electronic devices based on this received information. The intelligence system can be in wireless communication with the collection systems, e.g., through a public or private network using Wi-Fi, cellular, etc . . . .

In addition, or in the alternative, the intelligence system and one or more of the collection systems can be connected through one or more wired connections. In this regard, when targets come within proximity of the collection systems, the collection systems will collect visual information and/or electronic signal information associated with the targets and transmit data points or packets of information, e.g., time and location stamped information, related to collected visual and/or electronic signal information to the intelligence system. The collection systems can be configured to transmit data points or packets substantially simultaneously or generally in real time when targets come within proximity to the collection systems. For example, the collection systems can send a data point including information corresponding to each electronic signal or visual identifier as it is captured or can send a data packet including information corresponding to multiple electronic signals or visual identifiers received. In addition, or in the alternative, the collection systems can transmit the data points or packets at specific time intervals, such as every few seconds, minutes, hours, etc. or at other times or intervals after the electronic signals or visual identifiers are captured, without departing from the scope of the present disclosure.

FIG. 1 further shows that the intelligence system 102 will include a correlation and search capabilities or one or more correlation and search engines 104 and an intelligence database 106. The correlation and search engine 104 is configured to identify or extract electronic signatures and/or other targets associated with a target using collected visual and/or electronic signal information at the collection systems. In particular, the correlation and search engine 104 is configured to ingest or process the data points/data packets to associate or correlate the visual identifiers with the received electronic device signals and/or other visual identifiers of other targets to facilitate the identification or extraction of electronic signatures and/or other targets identifying the targets. The electronic signatures can include information related to the collected electronic signals of the transmitting electronic devices or combinations of collected electronic signals of the transmitting electronic devices that uniquely identify the targets. For example, and without limitation, a combination of one or more signals from a plurality of transmitting electronic devices 120, 122 (e.g., a watch, cell phone/communication device, headphones, etc.) can include an electronic signature that uniquely identifies a person; a combination of one or more signals from a plurality of transmitting vehicle components (e.g., a vehicle sensor, infotainment system, etc.) can include an electronic signature that uniquely identifies a vehicle, or one or more signals from a transmitting electronic device can include an electronic signature that uniquely identifies that electronic device.

The correlation and search engine 104 further can be configured to filter or otherwise alter the received electronic signatures (or information related thereto) to reduce or diminish signal noise and facilitate identification or extraction of unique, identifying electronic signatures. For example, the correlation and search engine 104 can apply filtering (e.g., linear or non-linear filters, dynamic noise reduction, etc.) to collected electronic signals to diminish, reduce, or substantially eliminate stationary and variable noise and other values that cannot be usefully correlated with targets, allowing unique electronic signal values to be extracted or identified.

In addition, the correlation and search engine 104 is configured to catalogue the electronic signatures and/or visual identifiers in the intelligence database with specific identifying characteristics allowing these identified electronic signatures and/or visual identifiers to become unique, identifiable, and searchable. The identifying characteristics can include, but are not limited to, geographical coordinates, time stamps, source manufacturer, source type and unique ID, etc., The correlation and search engine 104 also can be configured to build catalogs or groupings of independent data points/data packets in the intelligence database that allow correlation analysis to show what otherwise anonymous or non-unique electronic signals and/or other visual identifiers (e.g., other license plates) consistently appear with the targets. The surveillance system 100 thus can identify, track, map, catalogue, etc., the presence and/or movements of the targets in real time as electronic signals emanating therefrom occur in proximity to the collection systems or based on image captures of visual identifiers. The surveillance system 100 further can generate alerts or notifications when certain targets are in proximity to the collection systems. Still further, the surveillance system 100 further allows for the searches or queries of the intelligence database 106, e.g., for investigating locations or movements of suspects or other persons of interest.

In embodiments, the correlation and search engine 104 can use algorithms, models, statistical models, machine learning algorithms/models, Big Data analysis or statistics, etc., to infer relationships between transmitting electronic devices and/or targets based on consistency or likelihood of correlation of the visual identifiers and/or electronic signals of the transmitting electronic devices 120, 122. For example, the correlation and search engine 104 can be configured to evaluate and combine singular collection events at the collection systems with other catalogued events in the intelligence database 106 to develop correlated information related to the intersection of multiple collected/captured electronic signals and/or visual identifiers that occurred at a specific time and geographical area or location. The correlation and search engine 104 can use the frequency and/or consistency of electronic signals and/or visual identifiers received at collection systems to determine the relative certainty of association of the transmitting electronic devices and/or targets to develop electronic signatures (correlated electronic devices) or correlated targets (e.g., correlated license plates) for the targets.

The correlation and search engine 104 can be programmed to determine a likelihood or probability that a specific electronic signal, a combination or set of electronic signals, and/or other target or targets are associated with a target, and if the determined likelihood or probability meets a prescribed/selected likelihood or probability threshold, the engine will identify or extract an electronic signal or combinations of electronic signals as an electronic signature or electronic signatures to be associated with that target. In one embodiment, the likelihood or probability threshold can be about 70% or more (e.g., above 75%, above 80%, above 85%, above 90%, above 95%, above 98%, etc.) that an electronic signal, combination/set of electronic signals, and/or other targets are associated with a particular target.

For example, the correlation and search engine 104 may correlate two or more license plates and one or more electronic devices based on multiple events that such a combination is received. Based on such a correlation, a prediction of when a particular vehicle may be present at a specific location may be determined by the correlation and search engine. Further, the two or more license plates may be from or may define a convoy (e.g., group of vehicles). In such an example, the electronic devices may be associated with the convoy.

In some embodiments, the correlation and search engine 104 can be configured to determine or identify a location at which a visual identifier and correlated electronic signature and/or other visual identifier are matched to enable tracking and/or verification of targets at such a location. In addition, or in the alternative, the correlation and search engine 104 can be configured to associate identifying electronic signatures and/or other visual identifiers with visual identifiers, such as a visual vehicle identifier, to allow independent tracking and location identification of targets based on the associated identifying electronic signatures and other visual identifiers. For example, once the engine has records correlating electronic signatures and/or other visual identifiers, e.g., a license plate likely to be located at or near a specific visual vehicle identifier, associated with the specific visual vehicle identifier, e.g., a specific license plate number, the correlation and search engine will be able to detect the likely presence of a vehicle and its associated license plate without visual information of that specific vehicle, e.g., a camera may or may not be used. Furthermore, the collection systems can be placed in locations or areas not associated with vehicular traffic, such that the intelligence system 100 will be able to identify, and catalogue known electronic signatures away from the vehicles they have typically been associated with.

In this regard, in embodiments, the collection systems can be used in conjunction with existing ALPRs in certain areas or locations, allowing the intelligence system to develop a subset of electronic signatures and/or other license plate reads associated with a license plate read at a moment in time and location. For example, one or more collection systems can be positioned near or in close proximity to an existing ALPR to allow for correlation or association of received electronic signals with license plate reads. In addition, or in the alternative, an existing ALPR can be modified or retrofitted to include components of the collection point systems to enable collection of electronic signals with license plate reads. Further, in some embodiments, collection systems with or near cameras or ALPRs can be used in connection with collection systems without cameras or ALPRs, as generally indicated in FIG. 1. As a result, electronic data points from less expensive collection systems can be used to provide more precise tracking than ALPR alone. That is, the lower cost collection systems can increase collection density beyond the collection of ALPR or camera records, enabling data from both collection system types to be combined to provide more detailed intelligence and increased accuracy of verification or authentication of possible targets, including providing monitoring personnel (e.g. law enforcement, security or other personnel) with an increased level of confidence of locations of potential criminals, stolen or other vehicles of interest.

Additionally, or alternatively, collection systems without cameras (or with cameras 112) can be positioned in areas or locations that cannot be accessed by a vehicle, such as on trains, near railways, around public buildings, etc., to enable collection of electronic signals from persons away from their vehicle, e.g., for cataloguing, tracking, mapping, etc . . . positions or movements thereof.

The intelligence system 102 generally includes one or more processors, controller's, CPUs, etc., and one or more memories, such as RAM, ROM, etc., in communication with the one or more processors. The engine can include computer programming instructions stored in the one or more memories that can be accessed and executed by the one or more processors to facilitate execution of the processes thereof, e.g., correlation of information, identification and tracking of the targets, searching of the intelligence database, etc . . . .

Figure 3A:
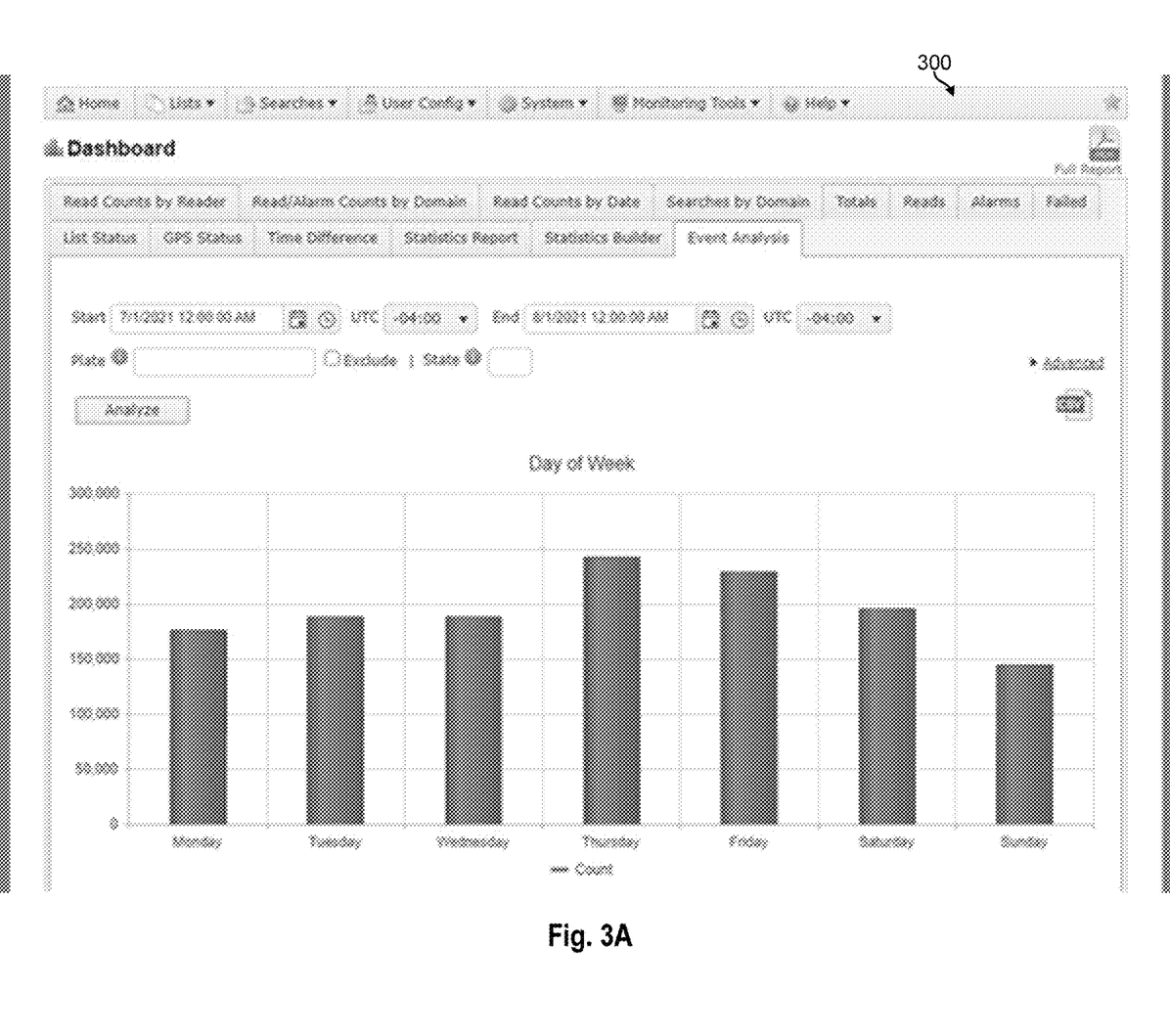
FIGS. 3A-3B show exemplary screen shots of an interface of a surveillance system according to embodiments of the present disclosure.
Figure 3B:
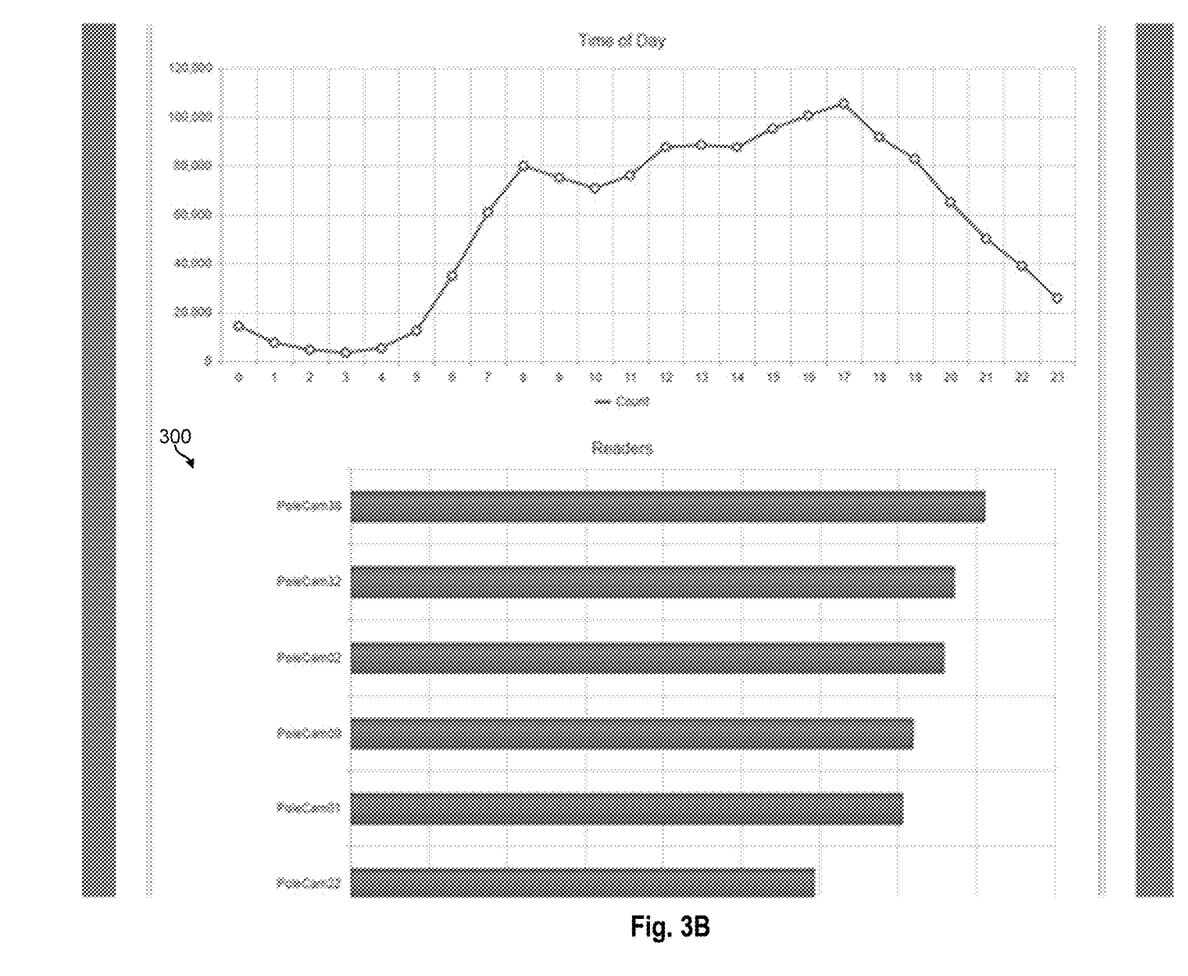

The correlation and search engine 104 can process the information from the received data points or data packages using a statistical analysis and/or machine learning algorithms to correlate the received read/target identification data with received alarms (e.g. hits indicating violations/criminal activities such as a stolen vehicle, warrants for the targets, etc . . . ). Operators then can search, query, and/or analyze the intelligence database, e.g., using a user interface 300 for visual navigation. as shown in FIGS. 3A-3B, for identification, mapping, tracking, etc., of vehicles and/or locations at specific times or days (e.g., Tuesday at 1 PM). Operators or managers can access summary tables/breakdowns of statistically significant variations in the date, day-of-week, time, location, violation class, investigative case and/or specific vehicle license plate or plates. Such embodiments allow an investigator to forecast the presence of a violation type, vehicle, or group of vehicles across time and location through a graphic charting interface 300 such as shown in FIGS. 3A and 3B.

In some embodiments, the surveillance system 100 can be configured to capture an electronic signature and associated information from a target, and can associate such electronic signature, as well as associate other targets, and associated information with the target's identification, e.g., license plate number or other visual identifier, with the correlation and search engine, and then allow searches for or provide alerts or notifications on receipts of similar electronic signature information and/or visual identifier at one or more of the collection systems.

Each capture will include a time stamp and can also include a location/geographical information. The time stamp can include a date, day, and time that the capture was captured. Further, the capture can include location data, as well as related targets. As such, a user may visualize, via a user interface 300, different sets or subsets of captures or reads, as illustrated in FIGS. 3A-3B. In embodiments, the user interface 300 may include a number or a plurality of tabs. Each tab may be configured to illustrate various aspects of the captured data. For example, one tab may include the amount of reads or captures for a particular or specified day, the amount of reads or captures for a particular or specified time period or interval, reads or captures for a particular or specified device, comparisons of captures over specified time periods, etc., In another embodiment, the user interface 300 may include a tab to generate a report or statistical report based on selected criteria (e.g., visual identifiers, electronic signature, time, different time periods or intervals, and/or other characteristics).

In an embodiment and as illustrated in FIG. 3A, the user interface 300 may include an event analysis tab. In such a tab, a user may select or input a time interval. After such a selection or input and after the user clicks or selects an "analyze" button, the user interface may, based on data included in the intelligence database, output a visualization of the specified time intervals. Such a visualization may include the number of events over each day of the specified time interval. In another embodiment, the user interface may generate a visualization based on the selection or filtering of alarms (e.g., stolen vehicles or other types of crimes) and/or locations. The visualization may include the number of reads or captures over each day of the specified time interval. Any other data point noted herein may be used in the visualization, rather than just captures or reads (e.g., correlations, alarms, visual identifiers, electronic signatures, etc.). As such, the user interface may include other inputs to allow a user to filter the results based on other characteristics. For example, the user can exclude or include a particular license plate, the state a license plate is from, make and/or model of a vehicle, type of vehicle (e.g., truck, SUV, sedan, etc.), color of a vehicle, a particular reader or collection device, alarms, crimes reported, and/or other characteristics.

In a further embodiment, once a visualization is generated, a user may view subsets of the visualization. In such examples, the user may select a subset of the visualization. For example, the user may input a subset of the time. In another example, the user may click or select a portion of the visualization. For example, if a user would like to review data for Thursday over the selected time period, the user can click on "Thursday" and a new visualization may be generated illustrating the data captured or read over time for that particular day, as illustrated in FIG. 3B. Further, as noted, the amount of reads for a particular reader for that time period may be illustrated.

In a further embodiment, the user interface may connect to the intelligence database via an API, such as a REST or RESTful API, a JSON based API, a XML based API, or any other API suitable for communication between a database and user interface. As different inputs or selections are made at the user interface, different requests or commands may be sent to the database, such as a GET or SQL query. For example, as a date or other input is entered and the "analyze" button selected, the user interface may send the request or command to the intelligence database for a particular set of data. Once the data is received at the user interface, the user interface may be configured to present the data in a readable format, e.g., a chart as illustrated in FIGS. 3A-3B.

In another embodiment, the user interface may be configured to allow download or sharing (e.g., via electronic transmission of a link) of the data visualization. In another embodiment, the user interface may, as noted, include boxes or sections for inputting data. In another embodiment, the user interface may include a drag and drop style interface, configured to allow a user to select certain data based on boxes dragged to a certain section of the user interface. In yet another embodiment, the user interface may include dropdown selections. The user interface may include some combination of each type of data input.

In an embodiment, a user can select a set of alarm classes to build the analysis on. By adding the ability to perform the analysis on a VRM or set of VRMs, and domains/sets, the analysis becomes an even more powerful tool for locating suspect VRMs or groups/gangs. The resulting output is a complex set of 3 bar charts that show the distribution of alarms by Day-of-week, time-of-day, and Set/location. The tool will have the flexibility for the manager to select/freeze one dimension of the analysis and thereby alter the view of the statistics to match that new filter. For example, if the manager knows he will deploy resources on, for example, a Friday night, he might select the 'Friday bar' on the visualization, which would alter the time and location bar charts to show only the statistics for the alarms that occurred on Fridays.

By way of example and not limitation, a user can select a set of data using the following parameters:
Date/Time.
Optional List of Domains/Sets.
Optional Individual VRM (Vehicle Registration Mark=license plate).
Optional set of Alarm Classes A statistical analysis of this data can then be displayed in a linked set of chart/bar graphs presenting:
1. Sets: shows the distribution of the search data set by Set Name (up to a maximum of 20).
2. Day of Week: shows the distribution of the search data set by the day of the week.
3. Hour of Day: shows the distribution of the search data set by the hour of the day.

Clicking on any chart element changes the view of the other two charts to show the distribution of ANPR events in the data set of the clicked element by the other two factors. It is possible to further analyse the data by selecting two of the graph elements to see the effect on the third element. For example, clicking on a Camera chart element and then clicking on a Day of Week chart element will change the Hour of Day chart to show the hourly distribution of ANPR events in the data set for the selected camera on the selected day only.

This operation is enhanced so that historic data analysis preserves the hour of the day across the Daylight Savings Time boundary, i.e., if the user is looking at the 3-4 pm hour the system is automatically collating data from 3-4 pm in the daylight savings period, and 3-4 pm outside the daylight savings period. There also will be a facility to export the Tabular dataset which underpins each histogram chart as a CSV file to facilitate external analysis, the ability to export this data is controlled by the Bulk Export privilege. The CSV data can be used in an externally provided spreadsheet tool to create any required charts. The ability to use the Event Analysis feature will be controlled by the Advanced Data Mining Feature Privilege. In addition, Verification of Identity (VOI) list classes can be used to help further define and/or filter an event analysis operation.

Figure 4:
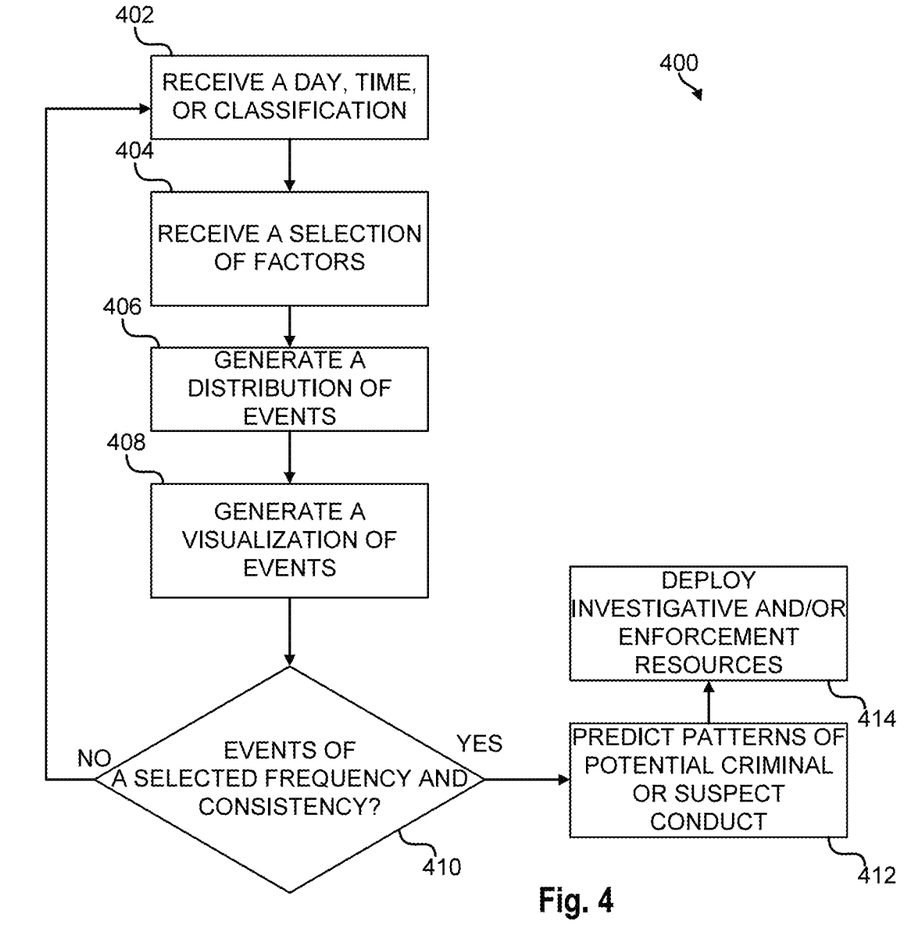
FIG. 4 is a flow diagram illustrating an example embodiment of a method for analysis operations according to embodiments of the present disclosure The use of the same reference symbols in different drawings indicates similar or identical items.

FIG. 4 illustrates a flow diagram for generating visualizations of events based on selected factors, according to an embodiment of the methods of operation of the systems and methods for electronic signature tracking and analysis as disclosed herein. The order in which the operations are described is not intended to be construed as a limitation, and any number of the described blocks may be combined in any order and/or in parallel to implement the methods.

At block 402, an intelligence system and/or surveillance system, via, for example, a user interface (e.g., user interface 300), may receive a selection of one or more of a day, time, or classification of a source of data or information. Further, at block 404, the intelligence system and/or surveillance system, via the user interface, may receive a selection of one or more factors. The one or more factors may include selection of types of events, specific targets, etc. At block 406, the intelligence system and/or surveillance system may generate a distribution of events based on the received day, time, and/or classification and the selection of one or more factors. At block 408, the intelligence system and/or surveillance system may generate a visualization of the events for display to the user interface.

At block 410, the intelligence system and/or surveillance system may determine whether the events exceed a selected frequency and/or exhibit a consistency. If the events do not exceed the selected frequency and/or do not exhibit the consistency, then the intelligence system and/or surveillance system may wait for new selections. If events do exceed the selected frequency and/or exhibit the consistency, then the intelligence system and/or surveillance system, at block 412, may predict a pattern of potential criminal and/or suspect conduct. Further, at block 414, the intelligence system and/or surveillance system may deploy investigative and/or enforcement resources based on the events exceeding a selected frequency and/or exhibiting a consistency.

Example case studies include the following:

1. (Identification and Tracking) Vehicle AB66CDE is in possession of a subject, for example, a known Offender who is in current stable employment working regular office hours. Intelligence suggests that the subject has been traveling to an area outside of a normal travel pattern area, and in which suspect behaviours/actions have been reported. The objective is to intercept the subject when en route back from the area of interest when the subject is likely in possession of illegal materials. A user, such as an intelligence officer, inputs a VRM into the NAS with a date range, e.g., the $1^{st}$-$31^{st}$ May for the current year, and an event analysis operation is performed, which indicates a distribution of location, day of the week and time of the day of subject movements as a composite display. The user can then select an individual camera on the anticipated route back from the subject area and the system will return the peak days for the relevant journey. The user then, having identified a particular day as the peak day of travel, causes the system to display the range of most likely times for the suspect travel to take place.

2. An Organized Crime Group (OCG) could have a number of identified vehicles, details of which (e.g., vehicle registration marks or license plate information, and other vehicle identifiers) can be provided on a CSV spreadsheet. A user, such as an Investigating Officer, may have limited resources or resources allocated for a limited date/time window, for example, for next Thursday during a 2-10 pm time period. The user can input the CSV of subject vehicle identifiers into the NAS and generates an event analysis based on a selected time period, e.g., the last 90 days of data based on Thursday's between 2 μm and 10 pm. This event analysis can provide a likely or most probable best location for allocation of resources for monitoring the OCG vehicle activities. In this scenario, the results could be returned as one 'set' of vehicle identifiers with no distinction of individual vehicles. If further detail as to individual vehicles is needed or desired, the individual vehicle identifiers can be processed individually.

3. (Tasking and Coordination of Resources) A police force is suffering an upsurge in crime, such as related to a county line drugs supply with associated violent crime. Intelligence suggests that the offenders are typically travelling into the area from 'exporting' metropolitan forces during a particular time window, such as during evening hours during the latter part of each week. In an attempt to gather further intelligence, the intention is to position intercept police on strategic routes at the times when suspect or known offenders are most likely to match this profile. The user creates an enquiry to run Thurs-Sat between 1800 and 0000 hours on selected strategic motorway cameras to identify the peak times and locations for the operation. The goal is to understand the cameras, where to position officers, and what times to put them there. Filtering using VOI lists can be needed when, for example, filtering out noise or other unrelated or unneeded data except for which cameras have the most traffic and at what times between 1800 and 0000, would be beneficial.

4. (Enhanced functionality) The head of a specialized law enforcement unit wishes to gainfully employ officers when not specifically tasked. The intention is to deploy the officers to areas where a higher prevalence of offences might happen. The user can select all cameras, all times, all days of the week along with a local domain, e.g., an "ABD Domain, location or area, to conduct an event analysis operation, and can further filter the results of the event analysis such as by using a VOI list, e.g., a filtering option for 'Gangs and Guns'. The resultant event analysis can indicate when and where such resources should be best deployed.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

The invention claimed is:

1. A surveillance system configured to provide statistical event analysis of alarms and events, the system comprising:
a plurality of collection assemblies configured to capture information related to visual identifiers, electronic signatures, or a combination thereof, that are associated with one or more targets in one or more selected areas;
a user interface configured to enable a user to select a time period for analysis or detection of a presence of one or more selected events, and one or more parameters relating to the one or more selected events, including a violation type, one or more known targets, a vehicle or group of vehicles, one or more alarm classes, one or more selected areas, or a combination thereof, during the selected time period; and an intelligence system comprising:
an intelligence database configured to store the captured visual identifiers, the electronic signature, and collected event data including received alarms indicative of different violation types; and
a classification and search engine configured to:
sort the collected event data into the one or more alarm classes,
using the captured information, determine a certainty of an association between one or more of the electronic signatures with one of the visual identifiers based on a frequency or consistency of the electronic signatures and the visual identifiers, and identify and associate one or more of the visual identifiers, electronic signatures, or combinations thereof, with one or more targets, and
in response to a user selection of the time period and the one or more parameters relating to the one or more selected events, develop an event analysis indicating a distribution of the one or more selected events during the selected time period, and develop a forecast of a frequency of occurrence of the one or more selected events, during the selected time period; and
using the event analysis, correlate captures of visual identifiers, electronic signatures of at least one target of the one or more targets with the one or more selected events.

2. The system of claim 1, wherein the user interface is further configured to enable the user to input a date range for the occurrence of the one or more selected events; and display the distribution of the one or more selected events during the selected time period and the input date range; and wherein, the classification and search engine is further configured to determine a maximum frequency of the occurrence of the one or more selected events over the input date range.

3. The system of claim 1, wherein one or more of the plurality of collection assemblies comprises an automatic license plate reader.

4. The system of claim 1, wherein captured information includes a date and a time stamp.

5. The system of claim 1, wherein one or more of a statistical or probabilistic model of the classification and search engine identifies the electronic signatures.

6. The system of claim 1, wherein the intelligence system is configured to track targets based on the electronic signatures identified from the captured information.

7. The system of claim 1, wherein the user interface is configured to enable visual navigation of variations in one or more of a day, a week, a time, an area, a violation class, or an investigative case.

8. The system of claim 1, wherein the intelligence system is further configured to deploy one or more of investigative resources or enforcement resources based on the one or more selected events exceeding a selected frequency, exhibiting a consistency of occurrence, or combination thereof.

9. A method for statistical event analysis of alarms and other selected events, the method comprising:
determine a certainty of an association between an electronic signature and a visual identifier based on a frequency or consistency of the electronic signature and the visual identifier, and identifying and associating the electronic signature, the visual identifier, or combinations thereof, with one or more targets;
receiving a fixed one or more of a day of the week, a time of the day, or a classification of a source;
receiving a selection of one or more factors;
generating a distribution of events in a data history based on the one or more targets and (1) the received fixed one or more of a day of the week, the time of the day, or the classification of the source and (2) the selection of one or more factors; and
generating a visualization of events based on the distribution.

10. The method of claim 9, further comprising, deploying, automatically and based on frequency and consistency of the events, one or more of investigative resources or enforcement resources.

11. The method of claim 9, further comprising, predicting, based on frequency and consistency of the events, patterns of potential criminal or suspect conduct of one or more selected targets at one or more locations and at one or more times.

12. The method of claim 11, further comprising, deploying one or more of investigative resources or enforcement resources based on the one or more selected events exceeding a selected frequency, exhibiting a consistency of occurrence, or combination thereof.

13. The method of claim 9, further comprising:
determining, based on the distribution of events, information to track movement of one or more selected targets; and
generating one or more visualizations based on the information to track movement of one or more selected targets.

14. The method of claim 9, wherein the data history is collected from one or more of an intelligence system or a plurality of collection systems.

15. The method of claim 14, wherein one or more of the intelligence system or plurality of collection systems are configured to gather data history related to one or more selected targets.

16. The method of claim 9, wherein the data history further comprises physical characteristics of a target, electronic signal of or associated with the target, other visual or audio information associated with the target, or other information related to a corresponding factor potentially related to the target.

17. A system for electronic signature tracking and analysis, comprising:
a plurality of collection assemblies configured to capture information associated with one or more targets in one or more selected areas and including visual identifiers, electronic signatures, or a combination thereof;
a user interface configured to enable a user to select a time period for analysis or detection of an occurrence of one or more selected events and one or more parameters relating to the one or more selected events, the one or more parameters including a violation type, one or more known targets, a vehicle or group of vehicles, one or more alarm classes, one or more selected areas, or a combination thereof, during the selected time period;
an intelligence system including:
one or more processors;
one or more computer readable memories storing instructions that, when executed by the one or more processors, cause one or more correlation and search engines to:
store captured information comprising the visual identifiers, the electronic signatures, and collected event data including received alarms indicative of different violation types;

sorting the collected event data into the one or more alarm classes;

determine a certainty of an association between one or more of the electronic signatures with one of the visual identifiers based on a frequency or consistency of the electronic signatures and the visual identifiers, and identify and associate one or more of the visual identifiers, electronic signatures, or combinations thereof, with one or more targets;

in response to receiving, through the user interface, a user selection of the time period and the one or more parameters relating to the one or more selected events, correlating the visual identifiers and the electronic signatures of at least one target of the one or more targets with the one or more selected events and developing an event analysis indicating a distribution of the one or more selected events during the selected time period, and developing a forecast of a frequency of occurrence of the one or more selected events, during the selected time period using the event analysis; and generate a visualization of the event analysis indicating an occurrence the of one or more selected events during the selected time period for display at the user interface.

18. The system of claim 17, wherein the event analysis further includes an indication of a number of the one or more selected events during the selected time period.

19. The system of claim 17, wherein the instructions further comprise receiving a user input to filter the event analysis based on a license plate, a make or model of a vehicle, a type of vehicle, or a color of vehicle.

20. The system of claim 17, wherein the instructions further comprise receiving a user input to filter the event analysis based on a specified one of the plurality of collection assemblies or a specified automatic license plate reader (ALPR).

* * * * *